A. H. WRIGHT.
FILM PACK HOLDER FOR CAMERAS.
APPLICATION FILED JUNE 26, 1907.

908,531.

Patented Jan. 5, 1909.

Witnesses.
C. H. Gannett
J. Murphy

Inventor.
Albert H. Wright
by Jas. H. Churchill
Atty.

THE NORRIS PETERS CO., WASHINGTON, D. C.

UNITED STATES PATENT OFFICE.

ALBERT H. WRIGHT, OF QUINCY, MASSACHUSETTS.

FILM-PACK HOLDER FOR CAMERAS.

No. 908,531.  Specification of Letters Patent.  Patented Jan. 5, 1909.

Application filed June 26, 1907. Serial No. 380,860.

*To all whom it may concern:*

Be it known that I, ALBERT H. WRIGHT, a citizen of the United States, residing in Quincy, in the county of Norfolk and State of Massachusetts, have invented an Improvement in Film-Pack Holders for Cameras, of which the following description, in connection with the accompanying drawings, is a specification, like letters on the drawings representing like parts.

This invention relates to a film pack holder for use in cameras, and has for its object to provide the holder with means as will be described, whereby different sizes of films may be used in the same camera.

As now commonly practiced, a plurality of films are assembled together in the form of a pack, each film having a projection or tab by which it may be removed from the pack holder, which latter as now commonly constructed is made of a size to fit the pack of films and is provided with a removable shutter or slide, and with an opening in its top through which the tabs on the films project, so as to be accessible to the operator and enable him to remove the films one by one, after they have been used.

The present invention has for its object to provide pack holders of the class described with means for permitting the holder to be used with film packs of different sizes as will be described. These and other features of this invention will be pointed out in the claims at the end of this specification.

Figure 1:
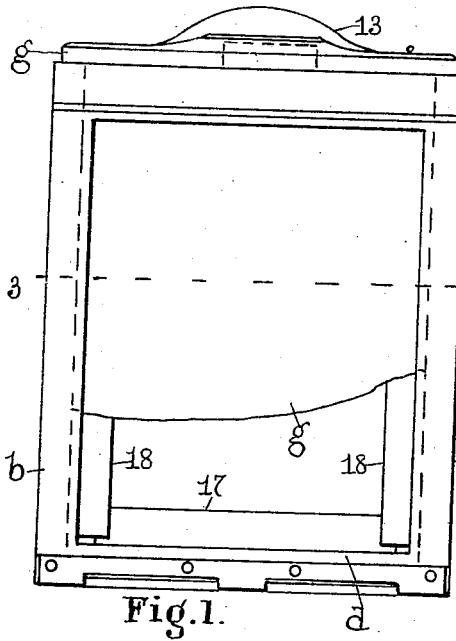
Figure 3:
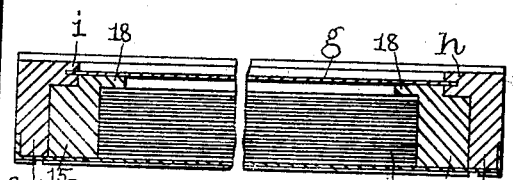
Figure 2:
Figure 4:
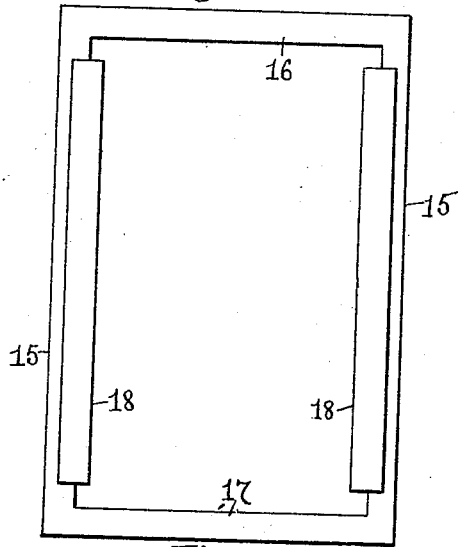
Figure 5:
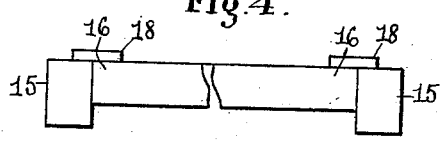
Figure 6:
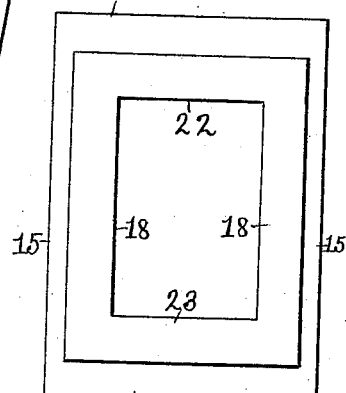
Figure 7:
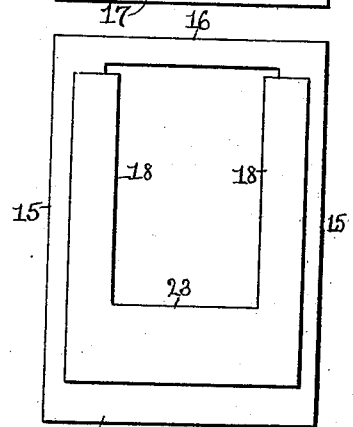
Figure 8:
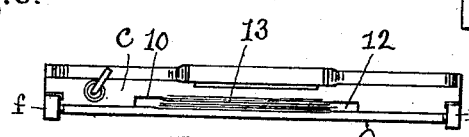

Figure 1 is a front elevation with parts broken away of a film-pack holder embodying this invention. Fig. 2, a side elevation of the holder shown in Fig. 1, with the back partially opened. Fig. 3, a cross-section on the line 3—3, Fig. 1. Figs. 4 and 5, details of the removable frame or holder to be referred to. Figs. 6 and 7, modifications to be referred to, and Fig. 8, a plan view of the holder shown in Fig. 1.

Referring to the drawings, I have shown the invention as embodied in a pack holder of ordinary construction and consisting of an open frame having side bars $a$, $b$, connecting top and bottom bars $c$, $d$, a removable back $e$ hinged at its lower end to the bottom bar $d$ and secured in its closed position by clips or levers $f$, and a slide or shutter $g$ movable in guideways in the flanges or lips $h$, $i$ on the side bars $a$, $b$. The open frame is designed to hold a pack of films, of a size to fit snugly between the side bars $a$, $b$ and bear against the flanges $h$, $i$ on said side bars, and the top bar $c$ has a cut-out portion 10, which coöperates with the upper edge of the back $e$ to form a slot 12 (see Fig. 8) through which extend the tabs or projections 13 on the film pack.

The pack holder as thus far described is designed to receive and firmly hold a pack of films of one size, as for instance a 4x5 film.

In camera practice, it is often desirable to take pictures of many objects, but the user is oftentimes restrained on account of the expense of the large size films, whereas if a smaller size of film could be used in the holder, the expense would be materially lessened. For this purpose I have provided an auxiliary or supplemental pack holder comprising an open frame having side, top and bottom bars 15, 16, 17 (see Figs. 4 and 5) and lips or flanges 18 on the side bars 15.

The supplemental frame or holder is made to fit snugly in the open frame of the main holder as represented in Fig. 3 with the side bars of the supplemental frame bearing against the flanges or lips $h$, $i$ of the side bars of the main frame, for which purpose the flanges or side strips 18 of the supplemental frame are secured or arranged on the side bars 15 of said supplemental frame away from the outer edge of the same a sufficient distance to permit the flanges or side strips 18 to pass by the inner edge of the flanges $h$, $i$ of the main frame, with the result that the strips or flanges 18 of the supplemental frame not only form front supports for the smaller film pack (see Fig. 3) but also position the exposed film of the smaller pack in the same focus as the larger film pack.

The top bar 16 of the supplemental frame is made of such thickness that its rear side or edge is substantially flush with the edge 10 of the slot 12 so as not to interfere with the tabs 13 passing through said slot.

In Figs. 3, 4 and 5, I have shown one size of supplemental pack holder, which may be used with a film pack 20 of the next size to the one used with the main holder, say for instance $3\frac{1}{4}$x$4\frac{1}{4}$, but I do not desire to limit my invention in this respect, as the supplemental frame may be made so as to take care of much smaller film packs. Such supplemental holders or frames are shown in Figs. 6 and 7. In Fig. 6, the top and bottom bars 16, 17 are provided with flanges, strips or ledges 22, 23 as well as the side bars, which leave an opening for the smallest size of film pack, as for instance, a brownie 2¼x3¼, whereas in Fig. 7 a slightly larger opening is left by omitting the flange or strip 22 on the top bar.

In Figs. 6 and 7, it will be observed, that the side strips or flanges are secured or attached to the side bars within the outer edge of said side bars, so as to permit the said flanges or strips to pass by the side bars of the main frame after the manner represented in Fig. 3.

It will thus be seen, that a plurality of different sizes of film packs may be used in a camera having a holder for the largest size of film pack, by providing a supplemental holder or frame for each of the smaller sizes of film packs, whose exterior dimensions are substantially the interior dimensions of the main holder but whose interior dimensions are such as to correspond to the different sizes of film packs, yet have the latter properly positioned in the main holder, so that the individual films of the smaller pack can be removed the same as those of the larger packs.

I have herein shown one construction of supplemental holder, which I may prefer, but I do not desire to limit my invention in this respect.

Claims.

1. The combination with a film pack holder, comprising an open frame, a movable back and a shutter in sliding engagement with said frame, of an auxiliary pack holder consisting of an open frame fitted within the main frame and provided with side flanges or strips, substantially as described.

2. The combination with a film pack holder, comprising an open frame, a movable back and a shutter, of an auxiliary pack holder fitted within said open frame, substantially as described.

3. An auxiliary film pack holder, comprising an open frame provided with side bars between which the film pack is inserted, and flanges or strips attached to one face of said side bars within the outer edge of the same and projecting beyond the inner edge of said side bars, substantially as described.

4. An auxiliary film pack holder comprising an open frame within which the film pack is placed, and strips or flanges on said frame projecting within the same and against which the film pack bears, substantially as described.

5. An auxiliary film pack holder, comprising an open frame consisting of top, bottom and side bars, said top bar being thinner than said side bars to leave a space for the projecting tabs of the film pack, and means to prevent the film pack passing through said holder.

6. The combination with a film pack holder, comprising an open frame, of an auxiliary pack holder fitted within the main holder and provided with means for preventing the film pack passing through the auxiliary holder while permitting the smaller films to be placed in the same focus as the larger films, substantially as described.

In testimony whereof, I have signed my name to this specification in the presence of two subscribing witnesses.

ALBERT H. WRIGHT.

Witnesses:
JAS. H. CHURCHILL,
J. MURPHY.